(12) United States Patent
Fuchs et al.

(10) Patent No.: US 12,086,128 B2
(45) Date of Patent: Sep. 10, 2024

(54) MECHANISMS FOR SERIALIZING TRIPLES OF A DATABASE STORE

(71) Applicant: Salesforce, Inc., San Francisco, CA (US)

(72) Inventors: Matthew Fuchs, Los Gatos, CA (US); Antonio Garrote, San Francisco, CA (US); Kelly Henvy, Salem, OR (US); Pawel Psztyc, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 64 days.

(21) Appl. No.: 17/811,500

(22) Filed: Jul. 8, 2022

(65) Prior Publication Data

US 2024/0012802 A1 Jan. 11, 2024

(51) Int. Cl.
*G06F 16/23* (2019.01)
*G06F 16/215* (2019.01)
*G06F 16/22* (2019.01)
*G06F 16/28* (2019.01)

(52) U.S. Cl.
CPC ........ *G06F 16/2358* (2019.01); *G06F 16/215* (2019.01); *G06F 16/2246* (2019.01); *G06F 16/288* (2019.01)

(58) Field of Classification Search
CPC ............. G06F 16/2358; G06F 16/2246; G06F 16/215; G06F 16/288
See application file for complete search history.

(56) References Cited

U.S. PATENT DOCUMENTS

| | | |
|---|---|---|
| 7,979,455 B2 | 7/2011 | Krishnamoorthy et al. |
| 10,437,804 B1 | 10/2019 | Tsypliaev et al. |
| 10,831,452 B1 * | 11/2020 | Hunter .................. H04L 9/3263 |
| 2008/0109420 A1 | 5/2008 | Britton et al. |
| 2008/0243770 A1 | 10/2008 | Aasman |

(Continued)

FOREIGN PATENT DOCUMENTS

JP 201325787 A 8/2014

OTHER PUBLICATIONS

Office Action in mailed U.S. Appl. No. 17/811,473 mailed Dec. 1, 2023, 34 pages.

(Continued)

*Primary Examiner* — Kris E Mackes
*Assistant Examiner* — Lin Lin M Htay
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to the serialization of data of a database. A computer system may maintain a database that stores data as a plurality of triples. A triple may include a first data entity that is connected to a second data entity via an edge, and triples of the plurality of triples may be connected to form graphs. The computer system may store metadata defining types of edges between data entities. An edge's type may indicate a procedure for serializing a target data entity connected to that edge's type. The computer system may receive a request to access a data entity associated with a plurality of descendant data entities connected to the data entity via edges. The computer system may generate an output having the data entity and one or more of the plurality of descendant data entities that are serialized according to the types of edges.

20 Claims, 12 Drawing Sheets

(56) References Cited

U.S. PATENT DOCUMENTS

| | | |
|---|---|---|
| 2011/0022636 A1 | 1/2011 | Yalamanchi |
| 2013/0238667 A1 | 9/2013 | Carvalho et al. |
| 2013/0297660 A1 | 11/2013 | Yalamanchi et al. |
| 2015/0020199 A1* | 1/2015 | Neil .................... H04L 63/1408 726/23 |
| 2015/0149466 A1* | 5/2015 | Harten .................. G06F 16/282 707/738 |
| 2017/0132329 A1* | 5/2017 | Yakout ................ G06F 16/9024 |
| 2017/0220636 A1 | 8/2017 | Behal et al. |
| 2019/0028369 A1 | 1/2019 | Wiener et al. |
| 2020/0090053 A1* | 3/2020 | Silverman ............. G06F 40/211 |
| 2021/0149851 A1 | 5/2021 | Belezko et al. |
| 2021/0263933 A1 | 8/2021 | Kobayashi |
| 2022/0318426 A1 | 10/2022 | Solheim et al. |
| 2023/0169117 A1 | 6/2023 | Bedi et al. |

OTHER PUBLICATIONS

Office Action in U.S. Appl. No. 17/811,473 mailed May 28, 2024, 41 pages.

\* cited by examiner

Triple Metadata 130

|  | Strength | Metatype |
|---|---|---|
| Entry 310A — Triple 125A | Weak | Dead |
| Entry 310B — Triple 125B | Strong | Recurse |
| Entry 310C — Triple 125C | Weak | Reference |
| Entry 310D — Triple 125D | Weak | Reference |

FIG. 3

```
Output 800

{"@graph": [
  {
    "@id":"id://A",
    "b": {
    "@id": "id://F",
      "h":"id://M"
    },
    "a": {
      "@id":"id://B",
      "c": "Scalar0",
      "d": {
        "@id":"id://E",
        "e": "Scalar0",
        "g": {
    "@id": "id://G",
    "z": {
      "@id": "id://K",
          "o": "id://M"
        }
       }
      }
     }
   },
   {
     "@id": "id://M",
      "q": "Scalar3"
    }
]}
```

FIG. 8B

MECHANISMS FOR SERIALIZING TRIPLES OF A DATABASE STORE

BACKGROUND

Technical Field

This disclosure relates generally to database systems and, more specifically, to various mechanisms for garbage collection and serializing of data of a database store.

Description of the Related Art

Enterprises routinely implement database management systems (or, simply "database systems") that enable users to store a collection of information in an organized manner that can be efficiently accessed and manipulated. A database system can implement any of a variety of different types of databases to store information, such as a relational database, a non-relational database, etc. During operation, a database system receives requests from users via applications or from other systems, such as another database system, to perform transactions on information stored in a database store of the database system. As part of performing those transactions, the database system may use keys (or other constructs) specified in the requests to read information out from that database store and/or write information back to the database store.

BRIEF DESCRIPTION OF THE DRAWINGS

FIG. 3 is a block diagram illustrating example elements of triple metadata, according to some embodiments.

FIGS. 8A-B are block diagrams illustrating an example serialization of a portion of a set of graphs into an output, according to some embodiments

DETAILED DESCRIPTION

Figure 1:
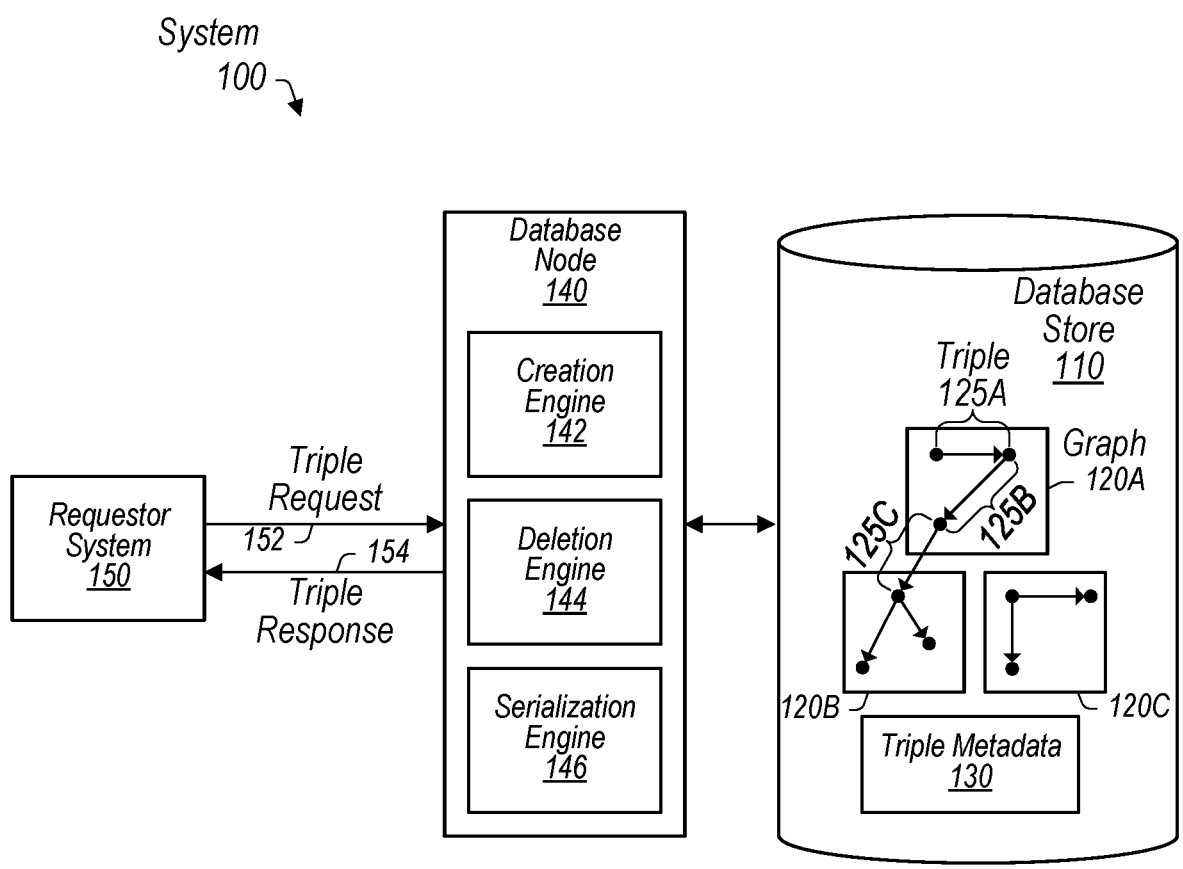
FIG. 1 is a block diagram illustrating example elements of a system for serializing and deleting triples of a database store, according to some embodiments.

In various implementations, in order to store data, a database system utilizes a Resource Description Framework (RDF) store (or, alternatively referred to as a "triplestore") that serves as a database store of the database system for storing data as triples. A triplestore is traditionally used in cases where the relationship between items in the system is important. For example, a triplestore may be used for semantic analysis in which sentences can be diagrammed as graphs, which permits machine learning algorithms to reason about a language. Triplestores are often used to link uniform resource identifiers (URIs) of the Web to form a graphical representation of different pieces of information on the Web. As mentioned, a triplestore stores data as triples. Within the context of a triplestore, a "triple" refers to a data construct having a subject/source, a predicate/edge, and an object/target. The subject is linked to the object via the predicate. For example, "Bob knows Fred," "Fred is 35," and "Fred owns candy" are each a triple. Triples can be linked such that the object of a first triple becomes the subject of a second triple—e.g., "Bob knows Fred" and "Fred is 35" can be linked through the common node "Fred" that serves as the object of "Bob knows Fred" and the subject of "Fred is 35". As a result of this linkage capability, triples can form a graph in the classical sense. As discussed in this disclosure, triples can also be extended to become "quads" by adding a fourth element that identifies their graph. Thus, when data is received at the database system, it may be parsed and stored as triples within different graphs, where the triples are associated with a fourth element identifying their graph.

In many cases, the database system receives a request to delete a triple. The deletion of a triple can result in the deletion of other triples that are linked. In particular, a data entity can serve as the target of a first triple and the source of a second triple. Consequently, when deleting the first triple, the data entity is deleted (assuming it is not the target of another triple) and thus the source of the second triple is missing, which causes the second triple to be deleted. Graphs can be linked in which at least one triple spans between those graphs. As a result, the deletion of a graph can result in the deletion of other graphs through a cascading deletion of triples. The present disclosure addresses, among other issues, how to determine whether a referenced graph should be deleted when deleting a requested graph. Furthermore, because graphs can be linked, a read request could be received to read out a portion of a graph that is linked to other graphs in the triplestore. Accordingly, this disclosure also addresses how to determine how much data to read out in response to such a read request.

In various embodiments described below, a system maintains a database store (e.g., an RDF store) that stores data as triples that are linked to form graphs. At least two of those graphs may be linked via one or more triples that originate in one of those graphs and end in the other graph. In various embodiments, the system further stores metadata that defines the strength of an edge between graphs. The types of edge strengths between graphs may include weak edges and strong edges. In various embodiments, the removal of a weak edge (as a part of the deletion of a triple) has no impact on the existence of the data entity that is the target of that edge while the removal of a strong edge causes the data entity to be deleted if there is no other strong edge connected to the data entity. The system may receive a request to delete a triple or a graph from the database store. When deleting the triple or the graph, all edges of affected triples originating in the graph to other graphs are evaluated based on their strength. If the target data entity (that is connected to an edge being evaluated) is connected to only one strong edge (the edge being evaluated), then the data entity and its triple are deleted. In some cases, edges from a first graph to a second graph are connected to the root data entity of the second graph. Thus, the deletion of an edge to another graph can result in the deletion of the entire other graph. Accordingly, when processing a request to delete a triple/graph, the system can determine, based on metadata about edge strengths, which ones of the other graphs to delete in addition to the graph identified in the request. Once the requested graph and any other additional graphs are deleted, the system may return a completion response to the requestor. As such, the system may implement proper garbage collection by ensuring that the correct data entities linked to the requested data entity are deleted when the requested data entity is deleted.

In some embodiments, the system also stores metadata specifying metatypes for edges that define how to treat data entities and their triples that follow from those edges when reading out triples. In response to receiving a read request to read out data of a graph, the system may serialize a subsection or all of the graph by reading out triples of the graph and converting them into another requested format, such as JavaScript Object Notation (JSON). This process may involve recursively traversing triples starting with edges of a certain data entity. In some cases, edges originating within that graph may connect to other graphs and thus subsections or all of the other graphs may also be serialized. For a given edge that is encountered during the process, in various embodiments, the system applies the appropriate metatype to that edge to determine how to serialize the triples that follow from that edge. For example, an edge may be a recurse edge and thus the target data entity of that recurse edge (and a portion of its descendants) may be serialized (e.g., formatted into a JSON response) as a child of the source data entity. In some embodiments, the system constructs an array of trees as an output from the serialization process and return that array as a response to the requestor.

These techniques may be advantageous as they provide mechanisms for implementing garbage collection and serialization of graphs that are interconnected and thus allow for graphs of a triplestore to be interconnected. Accordingly, deletion operations can be designated at the graph level such that entire blocks of data can be deleted while ensuring that referenced objects are also correctly deleted. Furthermore, the metadata that specifies metatypes that control how data is read out from the database may be configured depending on the use case such that data can be read out differently in different use cases. An exemplary application of these techniques will now be discussed, starting with reference to FIG. 1.

Turning now to FIG. 1, a block diagram of a system 100 is shown. System 100 includes a set of components that may be implemented via hardware or a combination of hardware and software routines. In the illustrated embodiment, system 100 includes a database store 110, a database node 140, and a requestor system 150. As further shown, database store 110 includes graphs 120A-C (having triples 125) and triple metadata 130, and database node 140 includes a creation engine 142, a deletion engine 144, and a serialization engine 146. System 100 may be implemented differently than shown. As an example, there may be a database cluster having multiple database nodes 140 that interact with database store 110.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, databases (e.g., database store 110), and entities (e.g., a third-party system) relating to system 100. In various embodiments, system 100 is implemented using a cloud infrastructure provided by a cloud provider. Database store 110 and database node 140 may thus execute on and utilize the available cloud resources of that cloud infrastructure (e.g., computing resources, storage resources, network resources, etc.) to facilitate their operation. For example, database node 140 may execute within a virtual environment hosted on server-based hardware included in a datacenter of the cloud provider. But in some embodiments, system 100 is implemented utilizing a local or private infrastructure as opposed to a public cloud.

Database store 110, in various embodiments, includes a collection of information that is organized in a manner that allows for access, storage, and manipulation of that information. Database store 110 may include supporting software (e.g., storage nodes) that enable database node 140 to carry out those operations (e.g., accessing, storing, etc.) on the information that is stored at database store 110. In various embodiments, database store 110 is implemented using a single or multiple storage devices that are connected together on a network (e.g., a storage attached network (SAN)) and configured to redundantly store information in order to prevent data loss. The storage devices may store data persistently and therefore database store 110 may serve as a persistent storage for system 100. In various embodiments, data written to database store 110 by a database node 140 is accessible to other database nodes 140 within a multi-node configuration.

Figure 2:
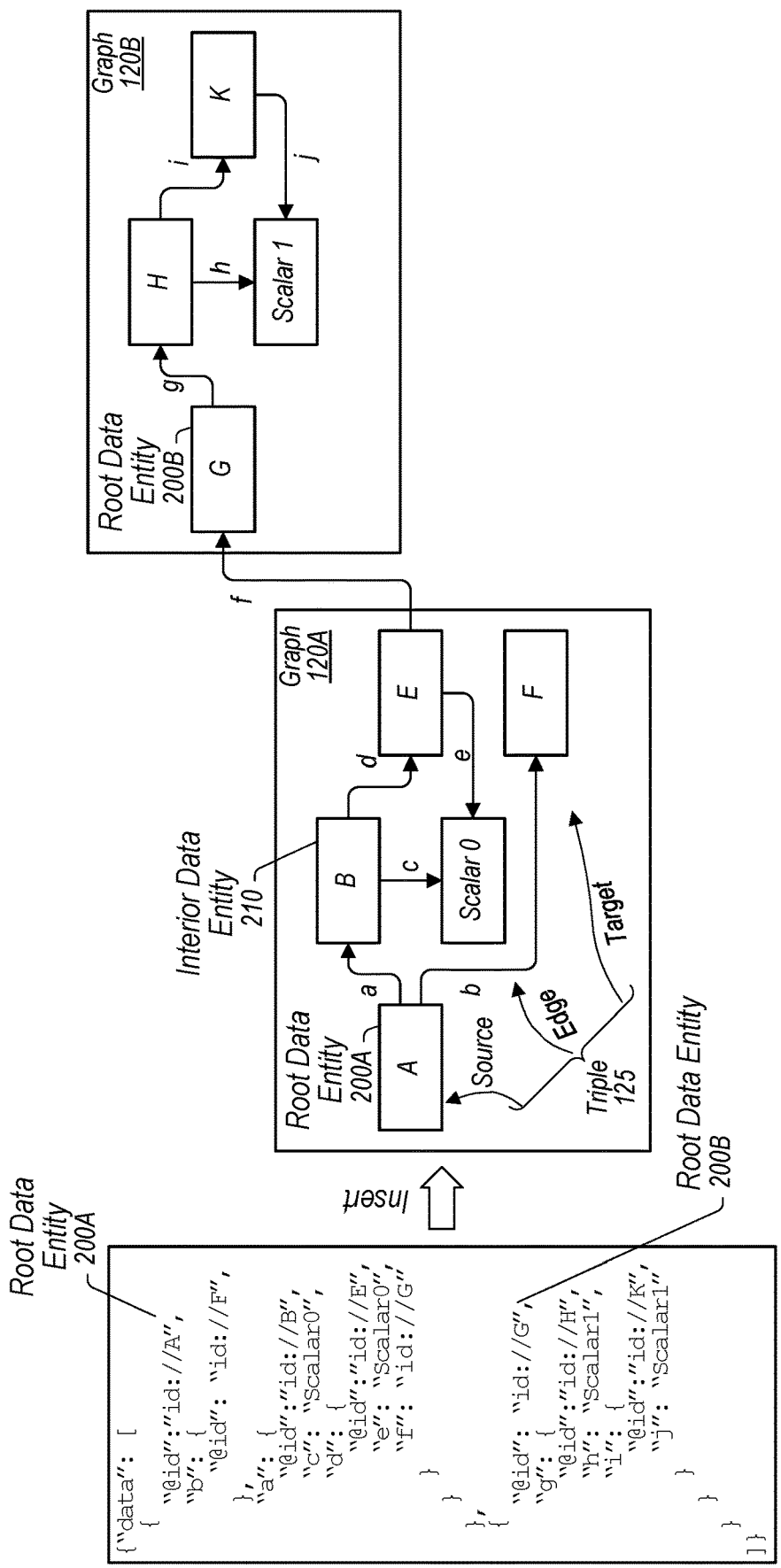
FIG. 2 is a block diagram illustrating an example insertion of data into a database store as triples, according to some embodiments.

In various embodiments, database store 110 is a triplestore, such as an RDF store, that stores data as triples 125. A triple 125, in various embodiments, is a data construct that includes at least three portions (i.e., a source data entity, a target data entity, and an edge that connects the source data entity to the target data entity and defines a direction from the source data entity to the target data entity) that are linked together. An example of a triple 125 is depicted in FIG. 2. While triples 125 (e.g., triples 125A-C) are depicted in graph form in FIG. 1, triples 125 may be represented via a table with three columns: the first giving the source, the middle (usually) giving the edge, and the third giving the target. In some embodiments, a triple 125 can include a fourth portion (e.g., a graph identifier identifying the graph 120 having that triple 125)—such a triple 125 can be referred to as a quad. A graph 120, in various embodiments, is a collection of interlinked triples 125 (e.g., graph 120A includes triple 125A and triple 125B that are linked). In particular, a JavaScript Object Notation (JSON) file may be received at database node 140, where that file includes data that is structured into a set of hierarchies. The data entities of a hierarchy may be stored as triples 125 in a graph 120 and thus each hierarchy of the JSON file may correspond to a different graph 120 stored at database store 110. Because triples 125 may be derived from hierarchical data, a graph 120 can include a root data entity from which all other data entities descend—these data entities can be referred to as descendant data entities of the root data entity. While a JSON file is discussed, data may be received in other forms, such as an Extensible Markup Language (XML) file. A graph 120 may also be cyclic or acyclic depending on the structure of the received data.

As shown, graphs 120 can be isolated (e.g., graph 120C) or linked together (e.g., graph 120A is linked to graph 120B via a triple 125). Because graphs 120 can be linked together and because the deletion of a triple 125 can cause the deletion of other triples 125, the deletion of a triple 125 (e.g., triple 125C) in one graph 120 (e.g., graph 120A) can result in the deletion of triples 125 in other graphs (e.g., graph 120B). Furthermore, due to the hierarchical nature of triples 125 stored in database store 110, reading out data may involve traversing graphs 120 that are linked together via triples 125. As a result, database store 110 includes triple metadata 130 to facilitate the deletion and serialization of triples 125.

Triple metadata 130, in various embodiments, specifies metatypes for data entities and edges of triples 125. With respect to data entities, triple metadata 130 may indicate whether a data entity is a root data entity or an interior data entity. A root data entity is the root of a graph 120 and may be the only data entity within that graph 120 that can be referenced (i.e., the target of a triple 125) from outside that graph 120. Consequently, an interior data entity might not be directly accessible but instead indirectly accessible via a traversal from its root data entity. In some embodiments, an interior data entity includes the name of the root data entity as the fourth value of a quad. With respect to deletion, triple metadata 130 may indicate whether an edge is weak or strong (alternatively, garbage collecting). In various embodiments, the removal of a weak edge (as a part of deleting its triple 125) has no impact on the existence of the data entity which is the target of that edge while the removal of a strong edge causes that data entity to be removed if there are no other strong edges connected to the data entity or strong edges that are not themselves subject to being deleted. In the context of serialization, triple metadata 130 may specify various metatypes for edges that define how to treat triples 125 that follow from those edges when reading out triples 125. For example, an edge may be a recurse edge, meaning that the target data entity of that edge and its descendants are serialized as a child of the source data entity of that recurse edge. Various example metatypes for serialization are discussed in greater detail with respect to FIG. 3. Using triple metadata 130, in various embodiments, the engines (e.g., deletion engine 144) of database node 140 are able to process received requests to delete or serialize triples 125 stored at database store 110.

Database node 140, in various embodiments, provides various database services, such as data storage, data retrieval, and data manipulation. Database node 140 may be a combination of hardware and software (e.g., a database application) executed on that hardware. In various embodiments, the database application is executed to provide the database services of database node 140 to components in system 100 and/or external to system 100. For example, as shown, database node 140 can receive (e.g., via an API, such as Java Database Connectivity) a request 152 from a requestor system 150 (e.g., an application node, a user device, etc.) to execute a set of database transactions. A database transaction, in various embodiments, is a logical unit of work (e.g., a specified set of database operations) to be performed in relation to database store 110. For example, processing a database transaction may include executing a delete command to delete a set of triples 125 or a graph 120 or an access command to access a set of triples 125 or a graph 120. Creation engine 142, deletion engine 144, and serialization engine 146 may be executed to process a transaction and the engine that is executed may depend on the commands of that transaction. For example, a delete command is processed by deletion engine 144 while a create command is processed by creation engine 142. In various embodiments, database node 140 and database store 110 together form a database system.

Creation engine 142, in various embodiments, facilitates the creation of graphs 120 and the insertion of triples 125 into existing graphs 120. As explained, information may be received at database node 140 that has a recursive structure, such as JSON, where a depth-first traversal will encounter root data entities before interior data entities. If the information is not structured such that the depth-first traversal is effective, then a topographical sort of triples 125 extracted from the information may render a correct ordering of those triples 125—in order to ensure the correct ordering, any triple 125 whose target data entity is a root data entity may be ignored as that triple 125 spans multiple graphs 120. Once the triples 125 are sorted, a depth-first traversal may place all data entities into their correct graphs 120. Root data entities are assigned a graph 120 and any data entity encountered, transitively, which is not a root data entity may be placed into the same graph 120. This process may partition the data entities into graphs 120. In various embodiments, this process is performed in response to receiving a request 152 from requestor system 150 to store information identified by that request 152. An example of creating graphs 120 from structured data is discussed in greater detail with respect to FIG. 2.

Deletion engine 144, in various embodiments, facilitates the deletion of triples 125 and graphs 120. A triple request 152 may be received from requestor system 150 that requests the deletion of a particular triple 125 or an entire graph 120. The deletion of a triple 125 or a graph 120 can lead to the deletion of other triples 125 or graphs 120. Consequently, deletion engine 144, in various embodiments, accesses triple metadata 130 and uses its information about edge strengths (i.e., strong or weak) to determine which triples 125 and graphs 120 should be deleted from database store 110. Deletion engine 144 may start at the source data entity of the specified triple 125 and traverse edges connected to data entities that descend from the source data entity. Based on triple metadata 130, deletion engine 144 may identify a set of graphs 120 to remove and then remove entire graphs 120 at a time. Examples of deleting triples 125 and graphs 120 are discussed in greater detail with respect to FIGS. 4-7.

Serialization engine 146, in various embodiments, facilitates the serialization of triples 125 and graphs 120 when reading out data from database store 110. A triple request 152 may be received from requestor system 150 that requests access to a particular triple 125 or an entire graph 120. As such, serialization engine 146, in various embodiments, accesses triple metadata 130 and uses its information about edge types (e.g., recursive, dead, etc.) to determine how to serialize triples 125 that follow from the edges of the requested triple 125. Serialization engine 146 may start at the source data entity of the requested triple 125 and traverse edges connected to data entities descending from the source data entity. Based on triple metadata 130, in various embodiments, serialization engine 146 serializes the data entities into an output (e.g., an array of trees). The output may be sent to requestor system 160 in a triple response 154. An example of serializing triples 125 is discussed in greater detail with respect to FIGS. 8A-B.

Requestor system 150, in various embodiments, is any of a variety of systems that seek to interact with database store 110 via database node 140. Examples of requestor systems 150 include other database nodes 140, user devices, and third-party systems. Requestor system 150 may interact with database store 110 by providing triple requests 152 to database node 140 and receiving back triple responses 154 from database node 140. A triple request 152 can identify a set of instructions to store, delete, and/or read out data from database store 110. In the case of storing data, the triple request 152 may include the data that is to be stored in graphs 120 as triples 125. A triple response 154 can include an acknowledgement that the set of instructions were executed and/or data in the case of a request to read out data.

Turning now to FIG. 2, a block diagram of an insertion of data into database store 110 as triples 125 that form graphs 120 is shown. In the illustrated embodiment, there is a block of data (which may be received as a part of a triple request 152), a graph 120A, and a graph 120B. As further shown, graph 120A comprises a set of data entities having a root data entity 200A, and graph 120B comprises a set of data entities having a root data entity 200B. The illustrated embodiment may be implemented differently than shown. For example, the block of data may be received in a different format and/or include additional information, such as the types (e.g., recursive) and strengths (e.g., weak) of the edges included in the data block.

As shown, the block of data is organized into hierarchies of data entities and edges. In particular, the illustrated block of data can be considered an array of trees. As a result, creation engine 142 may perform a depth-first traversal of the block in order to discover each tree within the array. In various embodiments, the top data entity of a tree corresponds to a root data entity 200 and all other data entities in the tree that descend from the top data entity are interior data entities 210. For each root data entity 200 that is discovered, a corresponding graph 120 may be created that includes that root data entity 200 and its descendant data entities. A data entity may be known to be a root data entity because the metadata may specify that the type of the JSON element is stored as a root. In JSON-LD, all nodes can have a type field. For edges, the full name of the edge might be the type of the edge. Consequently, in various embodiments, a triple 125 is weak because its type is weak. As depicted, the block of data includes root data entity 200A and root data entity 200B (which correspond to two different trees) and thus graph 120A and 120B are created that include root data entity 200A and root data entity 200B, respectively, along with their descendants (which become interior data entities 210 in graphs 120).

In the illustrated embodiment, graphs 120A-B are stored as triples 125. As an example, graph 120A includes a triple 125 (A, b, F), where "A" is the source data entity, "b" is the edge, and "F" is the target data entity. As depicted, that triple 125 includes a direction/flow from the source data entity to the target data entity—a target data entity being the destination/object of a triple 125. Consequently, when traversing graph 120A, database node 140 may move from data entity "A" to data entity "F" but not the other way around unless an edge going backwards is defined. In some cases, two data entities might be connected via two edges or a bidirectional edge that allows traversal in either direction between those two data entities. While not shown, a triple 125 can also include a reference (e.g., the name/value of the root data entity 200) to its graph 120.

In some cases, a data entity of one graph 120 specifies an edge to a data entity in another graph 120 and thus those two graphs 120 are connected. For example, in the block of data, the data entity "E" is connected to an edge that identifies the data entity "G," which is the root data entity of graph 120B. As a result, graphs 120A-B are connected via edge "f" as shown. Thus, when traversing graph 120A, database node 140 may traverse from graph 120A to graph 120B via edge "f" and then traverse data entities of graph 120B. In various embodiments, edges that connect to another graph 120 are connected to only the root data entity 200 of that graph. But in some cases, an edge may connect to an interior data entity 210 of another graph 120.

Turning now to FIG. 3, a block diagram of example elements of triple metadata 130 is shown. In the illustrated embodiment, triple metadata 130 includes a set of entries 310A-D that correspond to triples 125A-D. Also as shown, an entry 310 identifies a triple 125, the strength of the edge of that triple 125, and the edge's metatype. In some embodiments, triple metadata 130 is implemented differently than shown. For example, an entry 310 may identify an edge of a triple 125 instead of the triple 125, an entry 310 may identify the graph 120 that includes the triple 125 of that entry 310, and/or an entry 310 may indicate whether its source and target data entities are root data entities 200 and/or interior data entities 210. As another example, triple metadata 130 may also be stored in database store 110 using triples 125, such as a triple 125 that comprises (triple 125A→Strength→Weak), where the column (strength) maps to the edge between the triple 125A (which is the source data entity and may be represented using an identifier) and the value (weak in this example and is the target data entity) that is stored under the particular column for triple 125A. As another example of storing triple metadata 130 using triples 125, entry 310B may be represented as (triple125B→Metatype→Recurse).

As explained, triple metadata 130 can provide information to enable garbage collection and serialization of graphs 120 that are connected. In various embodiments, to enable garbage collection, triple metadata 130 specifies the strength of an edge connecting two graphs 120. As shown, triple 125A is indicated as having a weak edge—that is, the type of the edge in triple is weak. As a result, when triple 125A is deleted, in various embodiments, its target data entity is not deleted and the graph 120 having that target data entity is not considered for deletion. Triple 125B is indicated as having a strong edge. As such, when triple 125B is deleted, in various embodiments, its target data entity and the graph 120 having that target data entity are deleted if there is no other strong edge connected to the target data entity. In some embodiments, triple metadata 130 may specify strengths (e.g., weak) for edges between interior data entities 210 within a graph 120. Examples of different deletion scenarios are discussed in greater detail with respect to FIGS. 4-7.

In various embodiments, in order to enable serialization, triple metadata 130 identifies metatypes for edges. The metatypes may include, but are not limited to, dead, recurse, upgrade, reference, and rename. When encountering a dead edge, database node 140 may terminate the traversal down that path at that point. As a result, the data entities that descend from the dead edge are not serialized as a part of processing a triple request 152 unless there is another edge with another type that connects to the target data entity—i.e., a data entity might be serialized through a different path. When encountering a recurse edge, database node 140 may serialize the data entities that descend from that recurse edge as children of the source data entity of that edge. When encountering an upgrade edge, database node 140 may move the target data entity of the edge (and its descendants) upward in its current tree or store those data entities as a separate tree in an array—the array may store multiple trees as a block of data (e.g., the block of data depicted in FIG. 2) that can be returned to requestor system 150 in a triple response 154. When encountering a reference edge, database node 140 may store a reference to the target data entity instead of serializing the target data entity. When encountering a rename edge, database node 140 may substitute the edge for another edge and then reevaluate the metatype of the new edge in order to determine how to serialize the target data entity. Other metatypes may be specified, such as a metatype that causes database node 140 to serialize a target data entity under a different tree of the array. An example serialization involving multiple metatypes is discussed in greater detail with respect to FIGS. 8A-B.

Figure 4:
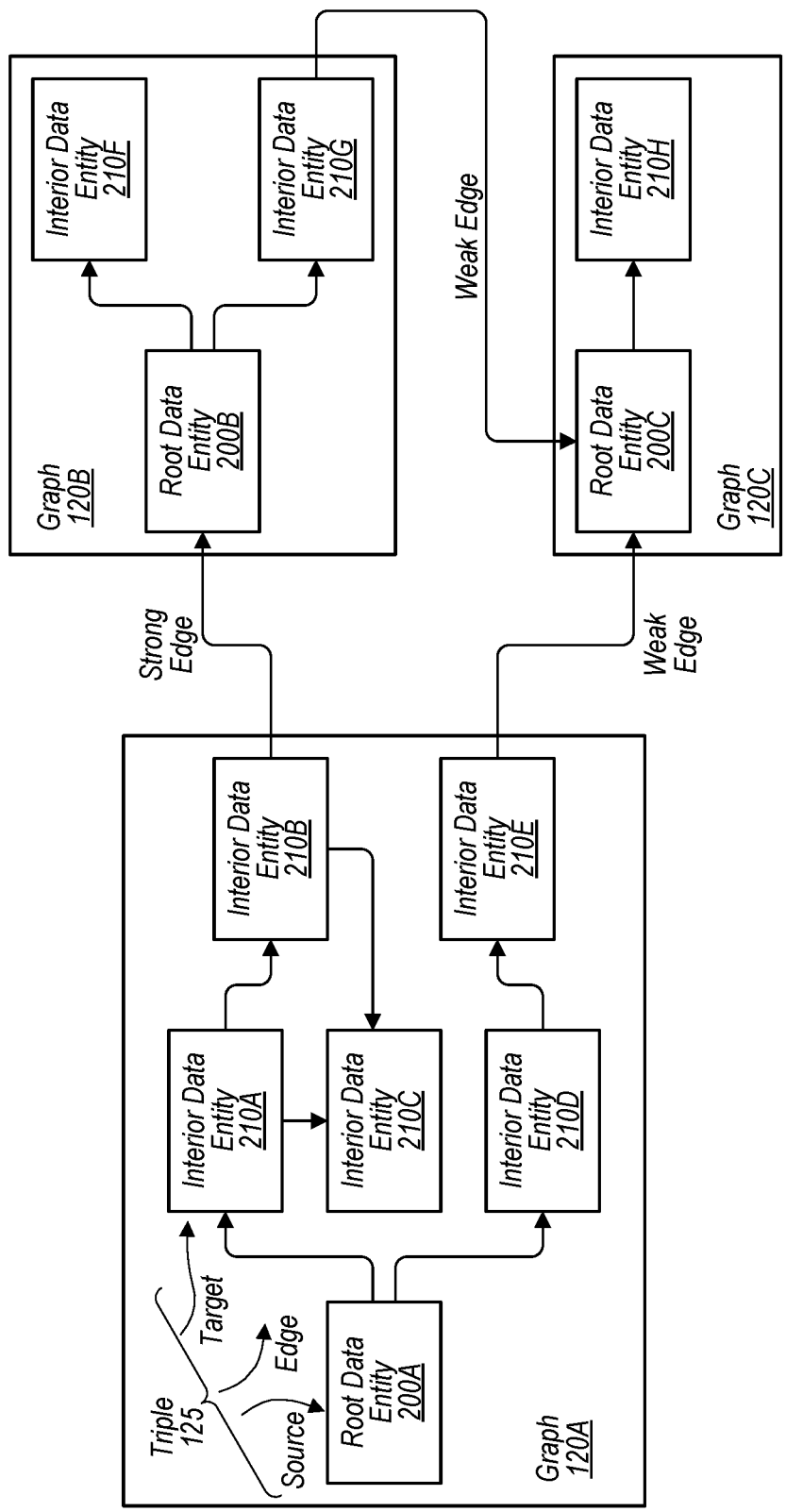
FIG. 4-7 are block diagrams illustrating example layouts of graphs connected via edges of different strengths, according to some embodiments.

Turning now to FIG. 4, a block diagram of an example layout of graphs 120 connected via edges of different strengths is shown. In the illustrated embodiment, there are graphs 120A-C, each having a set of data entities that are formed into triples 125. As illustrated, graph 120A includes a root data entity 200A and interior data entities 210A-E, and interior data entity 210B connects to a root data entity 200B of graph 120B via a strong edge. Graph 120B includes root data entity 200B and interior data entities 210F-G, and interior data entity 210G connects to a root data entity 200C of graph 120C via a weak edge—root data entity 200C is also connected to interior data entity 210E via a weak edge originating in graph 120A. As further shown, graph 120C includes root data entity 220C and interior data entity 210H. The illustrated embodiment might be implemented differently than shown. For example, the strong edge from interior data entity 210B may connect to an interior data entity 210 (e.g., interior data entity 210F) instead of a root data entity 200.

As explained, database node 140 may receive a triple request 152 to delete one or more triples 125 from database store 110. For example, a triple request 152 may request deletion of root data entity 200A. Since root data entity 200A is the root node of graph 120A and all other data entities in graph 120A are directly or indirectly connected to root data entity 200A, all the triples 125 in graph 120A are deleted. Because interior data entities 210B and 210E are deleted and the edges of their triples 125 connect to target data entities that are outside of graph 120A, deletion engine 144 determines whether the target data entities (i.e., root data entity 200B and root data entity 200C) should be deleted. In order to determine whether they should be deleted, in various embodiments, deletion engine 144 determines whether the edge that connects to the target data entity is strong or work and whether there are other strong edges connecting to the target data entity. As shown, a strong edge connects interior date entity 210B to root data entity 200B and no other strong edge is connected to root data entity 200B. Consequently, deletion engine 144 deletes all the triples 125 in graph 120B because the root node (i.e., root data entity 200B) is deleted. As shown, a weak edge connects interior date entity 210E to root data entity 200C and no strong edge is connected to root data entity 200C. Consequently, deletion engine 144 deletes the weak edge from interior data entity 210E and the weak edge from interior data entity 210G since graph 120B is also being deleted. Graph 120C is not deleted as there are no strong edges connecting to graph 120C that are deleted as part of this process.

As another example, a received triple request 152 may request deletion of interior data entity 210D. Deletion of interior data entity 210D may cause the deletion of interior data entity 210E because it is a target data entity of interior data entity 210D, but root data entity 200A is not affected other than the removal of the edge between interior data entity 210D and root data entity 200A. Since interior data entity 210E is deleted and the target data entity (i.e., root data entity 200C) of its triple 125 resides within another graph 120, deletion engine 144 determines whether the target data entity should be deleted. As mentioned, a weak edge connects interior date entity 210E to root data entity 200C and thus root data entity 200C and its graph 120C are not deleted. Because interior data entity 210D is not connected to graph 120B (i.e., there is no flow/path from interior data entity 210D to graph 120B), graph 120B is not affected as a result of the deletion of interior data entity 210D.

Figure 5:
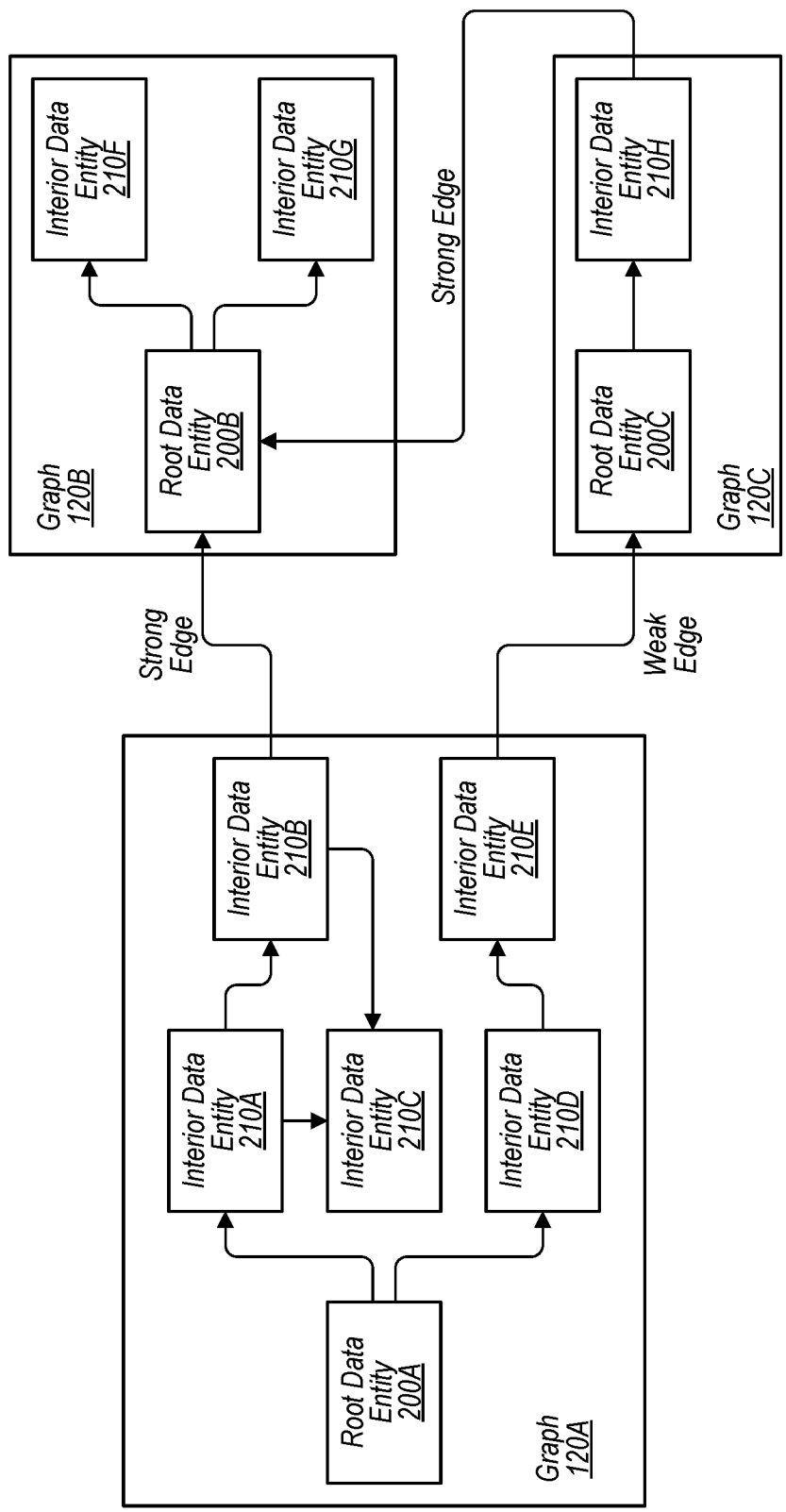

Turning now to FIG. 5, a block diagram of another example layout of graphs 120A-C is shown. Within the illustrated embodiment, graphs 120A-C are structured in a similar manner to graphs 120A-C of FIG. 4, except there is no weak edge from interior data entity 210G to root data entity 200C; instead, there is a new strong edge from interior data entity 210H to root data entity 200B of graph 120B. As mentioned, a triple request 152 might be received that requests the deletion of root data entity 200A, resulting in the deletion of all triples 125 of graph 120A. Because interior data entities 210B and 210E are deleted and their edges connect to target data entities that are outside of graph 120A, deletion engine 144 determines whether root data entity 200B and root data entity 200C should be deleted. As in FIG. 4, a weak edge connects interior date entity 210E to root data entity 200C and thus graph 120C is not deleted and the weak edge is removed. While a strong edge connects interior date entity 210B to root data entity 200B as shown, there exists another strong edge connecting interior data entity 210H to root data entity 200B. As a result, delete engine 144 determines to not delete root data entity 200B but instead simply removes the strong edge connecting interior data entity 210B to root data entity 200B.

Figure 6:
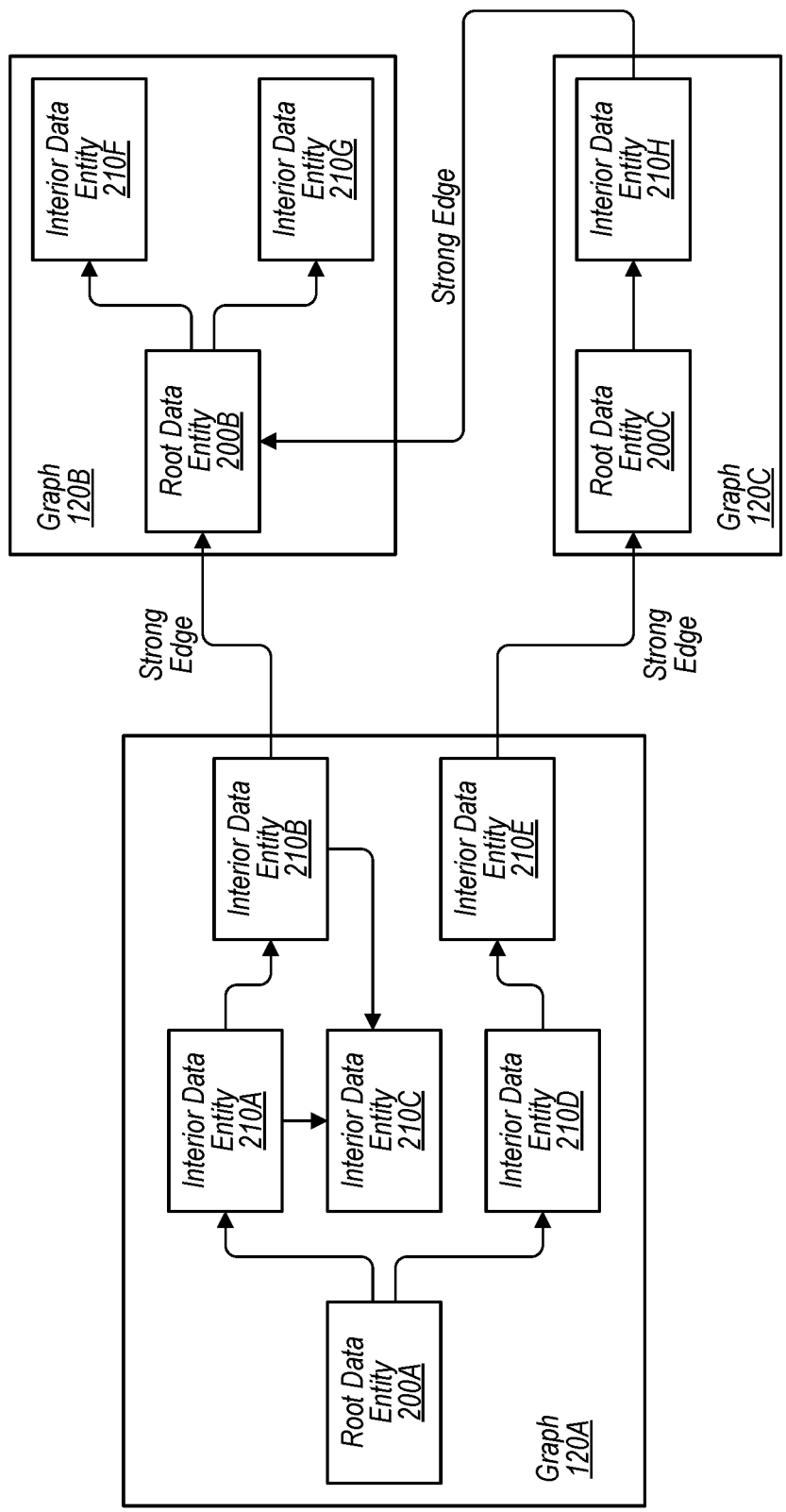

Turning now to FIG. 6, a block diagram of another example layout of graphs 120A-C is shown. Within the illustrated embodiment, graphs 120A-C are structured in a similar manner to graphs 120A-C of FIG. 5, except the edge that connects interior data entity 210E to root data entity 200C is a strong edge. As mentioned, a triple request 152 might be received that requests the deletion of root data entity 200A, resulting in the deletion of all triples 125 of graph 120A. Because interior data entities 210B and 210E are deleted and their edges connect to target data entities that are outside of graph 120A, deletion engine 144 determines whether root data entity 200B and root data entity 200C should be deleted. Since a strong edge connects interior date entity 210E to root data entity 200C and no other strong edge is connected to root data entity 200C, deletion engine 144 deletes all the triples 125 in graph 120C because the root node (i.e., root data entity 200*c*) is deleted. Since interior data entity 210H is deleted and its edge connects to a target data entity outside of graph 120C, deletion engine 144 determines whether root data entity 200B should be deleted. While root data entity 200B is connected to two strong edges, in various embodiments, deletion engine 144 determines that those edges are being deleted as part of the deletion of graphs 120A and 120C. Accordingly, since there is no other strong edge connected to root data entity 200B, deletion engine 144 determines to delete graph 120B. Thus, deletion of root data entity 200A causes the deletion of all the illustrated graphs 120.

Figure 7:
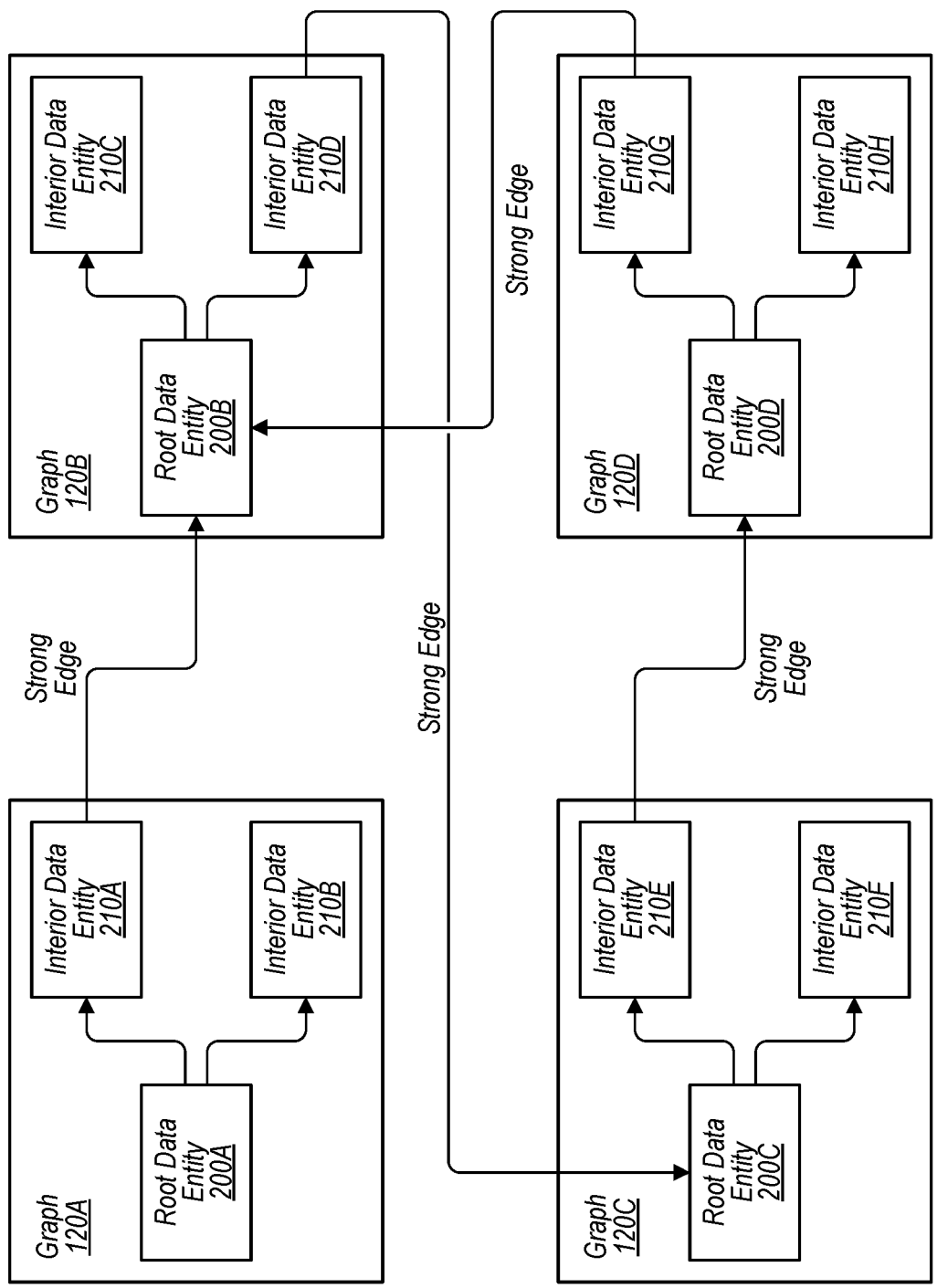

Turning now to FIG. 7, a block diagram of an example layout of four graphs 120A-D is shown. Within the illustrated embodiment, graphs 120A-D each comprise a set of data entities formed into triples 125. As depicted, graph 120A comprises a root data entity 200A and interior data entities 210A-B, graph 120B comprises a root data entity 200B and interior data entities 210C-D, graph 120C comprises a root data entity 200C and interior data entities 210E-F, and graph 120D comprises a root data entity 200D and interior data entities 210G-H. Graph 120A is connected to graph 120B via a strong edge from interior data entity 210A to root data entity 200B, graph 120B is connected to graph 120C via a strong edge from interior data entity 210D to root data entity 200C, graph 120C is connected to graph 120D via a strong edge from interior data entity 210E to root data entity 200D, and graph 120D is connected to graph 120B via a strong edge from interior data entity 210G to root data entity 200B. The illustrated embodiment may be implemented differently than shown—e.g., the layout depicted in FIGS. 4-6.

As mentioned, a triple request 152 might be received that requests the deletion of root data entity 200A, resulting in the deletion of all triples 125 of graph 120A. Since interior data entity 210A is deleted and its edge connects to a target data entity that is outside of graph 120A, deletion engine 144 determines whether root data entity 200B should be deleted. Because root data entity 200B is the target of another strong edge (i.e., the one originating from graph 120D) and since that other strong edge is not subject to deletion as part of the deletion of graph 120A, deletion engine 144 determines to not delete root data entity 200B. The configuration of graphs 120B-D prevents those graphs 120 from being deleted as part of the deletion of another graph 120 outside of that configuration. In the event that one of those graphs 120 in the configuration is deleted, such as graph 120C, then the entire configuration is deleted from database store 110, in various embodiments.

Figure 8A:
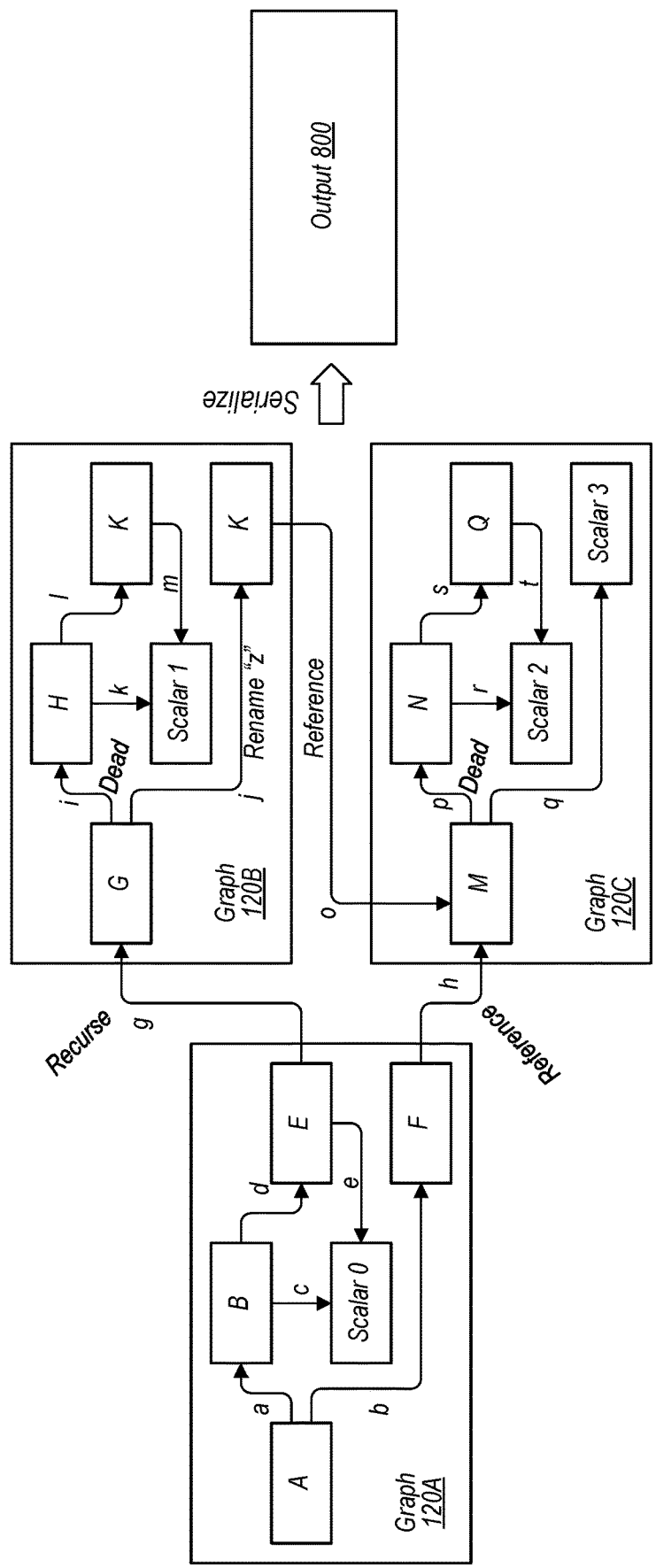

Turning now to FIG. 8A, a block diagram of a serialization of a portion of a set of graphs 120 into an output 800 is shown. In the illustrated embodiment, there are graphs 120A-C, each of which includes a root data entity and interior data entities. The illustrated embodiment may be implemented differently than shown. For example, output 800 may be structured differently than a hierarchy.

Database node 140 may receive a triple request 152 to serialize one or more triples 125 from database store 110 into an output 800 to be returned in a triple response 154. For example, a triple request 152 may request serialization of graph 120A or its root data entity. Accordingly, serialization engine 146 may start at root data entity "A" and then traverse down its edges "a" and "b" to interior data entities "B" and "F". In some embodiments, the default metatype that is assigned to an edge is recurse. Since a metatype has not been assigned to edges "a" and "b", serialization engine 146 may treat those edges as recurse edges and thus serialize data entities "B" and "F" as children of data entity "A", as shown in output 800. Similarly, edges "d" and "c" from data entity "B" to data entities "E" and "Scalar 0", respectively, along with edge "e" from data entity "E" to data entity "Scalar 0" may be serialized as recurse edges. As illustrated, edge "h" from data entity "F" to data entity "M" is a reference edge and therefore serialization engine 146 may store a reference to data entity "M" instead of serializing data entity "M" and its descendants. Edge "g" from data entity "E" to data entity "G" is a recurse edge and therefore data entity "G" is serialized as a child of data entity "E". Edge "i" from data entity "G" to data entity "H" is a dead edge and thus data entity "H" and its descendants are not serialized. Edge "j" from data entity "G" to data entity "K" is a rename edge "z" and therefore data entity "K" is serialized as a child of data entity "G" but the edge "j" is renamed to "z" in output 800. Edge "o" from data entity "K" to data entity "M" is another reference edge and therefore a reference to data entity "M" is stored in output 800.

After traversing down all the possible paths starting from data entity "A", serialization engine 146 produces the illustrated output 800. Output 800 may be returned to requestor system 150 in a triple response 154. While the example discussed above starts at a root data entity, in various cases, a triple request 152 may be received to serialize a portion of database store 110, starting at a particular interior data entity of a particular graph 120. For example, a triple request 152 may be received to serialize data entity "H" and thus an output 800 may be produced that includes only data entities "H", "K", and "Scalar 1" and their respective edges. An example of output 800 resulting from the above serialization is presented in FIG. 8B. While output 800 is depicted in a JSON format in FIG. 8B, in some embodiments, output 800 is in a different format, such as XML.

Figure 9:
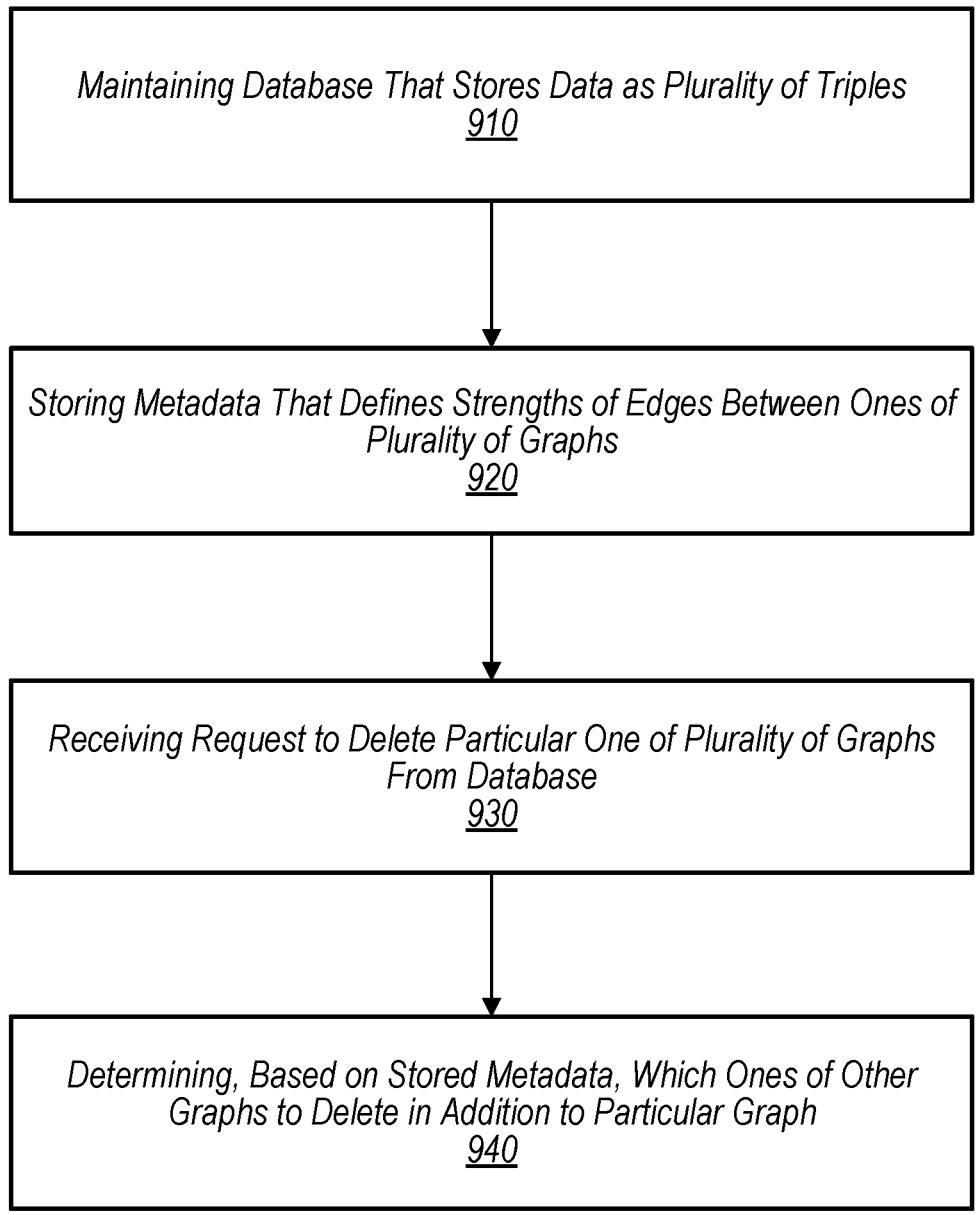
FIG. 9 is a flow diagram illustrating example method relating to deleting a portion of a set of graphs from a database store, according to some embodiments.

Turning now to FIG. 9, a flow diagram of a method 900 is shown. Method 900 is one embodiment of a method that is performed by a computer system (e.g., database node 140) to determine triples (e.g., triples 125) to delete from a database (e.g., database store 110). Method 900 may be performed by executing program instructions stored on a non-transitory computer-readable medium. In some embodiments, method 900 includes more or less steps than shown. For example, method 900 may include the computer system deleting a particular graph (e.g., a graph 120) from the database. The deleting may include identifying, from a plurality of triples, a set of triples having a graph identifier that identifies the particular graph and deleting the set of triples. As another example, method 900 might include a step in which the computer system serializes a portion of the data stored in the database.

Method 900 begins in step 910 with the computer system maintaining the database that stores data as the plurality of triples. A given one of the plurality of triples may include a first data entity that is connected to a second data entity via an edge. Ones of the plurality of triples may be connected to form a plurality of graphs. In some cases, the computer system receives information (e.g., a JSON file) that specifies a plurality of data entities. The computer system may parse the plurality of data entities to identify root data entities (e.g., root data entities 200) and descendent data entities (e.g., interior data entities 210) that descend from those root data entities. For a given one of those root data entities, the computer system may generate a graph having the given root data entity and descendent data entities of that given root data entity. In various embodiments, the descendent data entities of the given root data entity are not directly accessible via edges from other graphs. The metadata may indicate whether a given data entity of the plurality of data entities is a root data entity or a descendent data entity.

In step 920, the computer system stores metadata defining strengths of edges between ones of the plurality of graphs. In step 930, the computer system also receives a request (e.g., a triple request 152) to delete a particular one of the plurality of graphs from the database. The particular graph may include a set of edges originating in the particular graph to other graphs of the plurality of graphs. Those edges may connect to root data entities of the other graphs.

In step 940, the computer system determines, based on the stored metadata, which ones of the other graphs to delete in addition to the particular graph. The determining may include, for a particular one of the set of edges, the computer system determining whether the particular edge is weak or strong based on the metadata. Based on the particular edge being strong, the computer system may determine whether a target data entity of the particular edge is connected to another strong edge. In response to determining that the target data entity is not connected to another strong edge, the computer system may delete one of the other graphs that includes the target data entity. Based on the edge being weak, the computer system may prevent a target data entity of the particular edge from being deleted as a part of deleting the particular edge.

The determining may also include determining that a particular one of the set of edges is connected to a target data entity that is connected to a set of edges that originate in a set of graphs different than the particular graph. The set of edges may be strong edges. In response to determining that the set of graphs will be deleted as a part of deleting the particular graph, the computer system may delete one of the other graphs that includes the target data entity.

Figure 10:
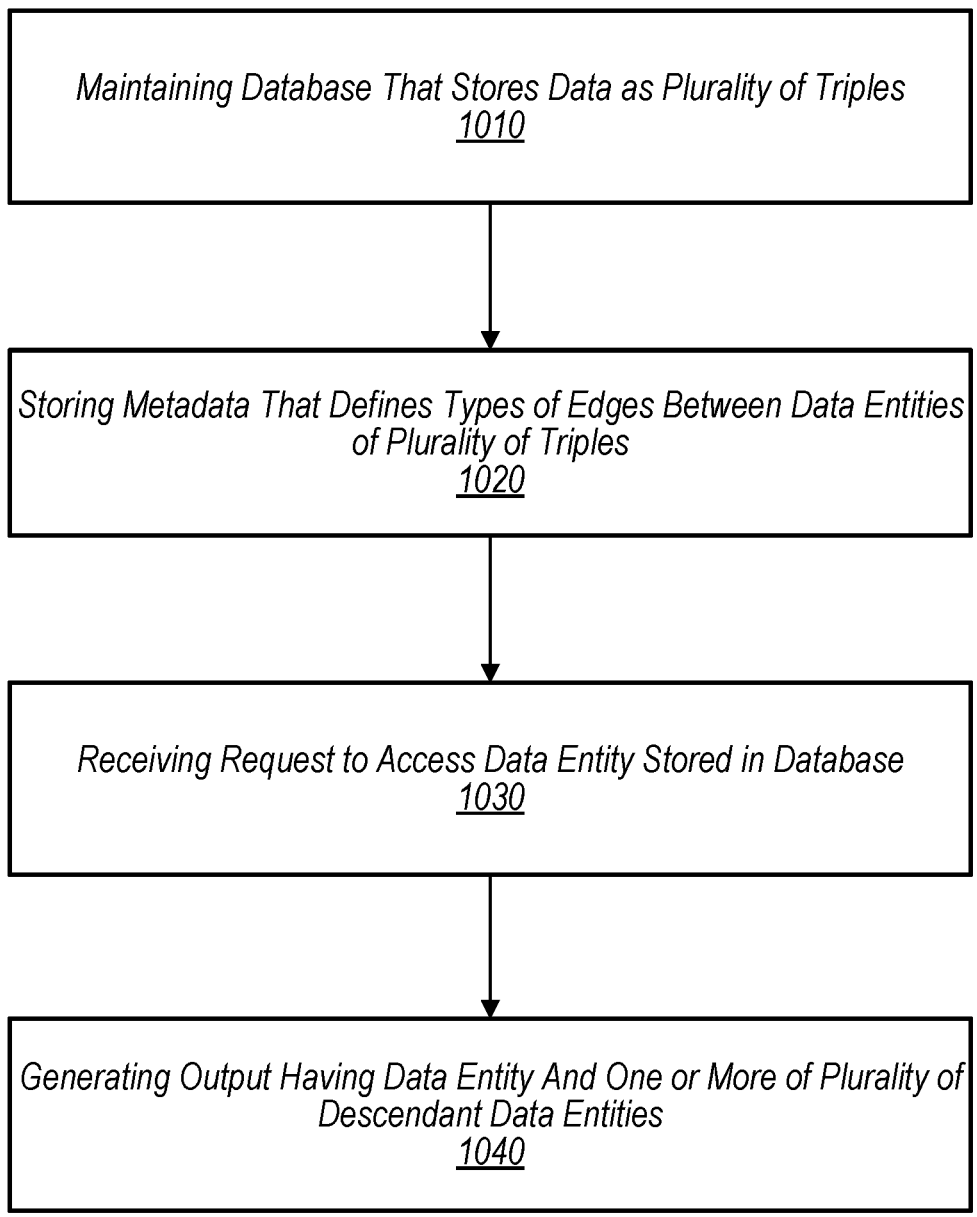
FIG. 10 is a flow diagram illustrating example method relating to serializing a portion of a set of graphs of a database store, according to some embodiments.

Turning now to FIG. 10, a flow diagram of a method 1000 is shown. Method 1000 is one embodiment of a method that is performed by a computer system (e.g., database node 140) to serialize triples (e.g., triples 125) from a database (e.g., database store 110) into an output (e.g., output 800). Method 1000 may be performed by executing program instructions stored on a non-transitory computer-readable medium. In some embodiments, method 1000 includes more or less steps than shown—e.g., method 1000 might include a step in which the computer system deletes a particular graph (e.g., a graph 120) from the database.

Method 1000 begins in step 1010 with the computer system maintaining the database that stores data as a plurality of triples. The computer system may receive information (e.g., the block of data presented in FIG. 2) that specifies a plurality of data entities. The computer system may parse ones of the plurality of data entities to identify root data entities (e.g., root data entities 200) and descendent data entities (e.g., interior data entities 210) that descend from the root data entities. For a given one of the root data entities, the computers system may generate a graph having the given root data entity and the descendent data entities of the given root data entity. A given one of the plurality of triples may include a first data entity connected to a second data entity via an edge, and ones of the plurality of triples are connected to form a plurality of graphs. In some embodiments, the given triple is associated with a graph identifier (e.g., the name of the root data entity of its graph) that identifies one of the plurality of graphs that includes the given triple.

In step 1020, the computer system stores metadata (e.g., triple metadata 130) that defines types of edges between data entities of the plurality of triples. A given one of the types of edges may indicate a procedure for serializing a target data entity connected to the given type of edge—e.g., a recurse edge may indicate that the target data entity should be serialized as a child of the source data entity of that edge. In step 1030, the computer system receives a request (e.g., a triple request 152) to access a data entity stored in the database. The data entity may be associated with a plurality of descendant data entities connected to the data entity via edges. In some cases, the data entity is a root data entity of one of the plurality of graphs, and the received request is a request to access the graph. At least one of the plurality of descendant data entities may be stored within a different graph of the plurality of graphs than the data entity. At least one of the plurality of descendant data entities may be indirectly connected to the data entity through a triple that does not include the data entity or the at least one descendant data entity.

In step 1040, the computer system generates an output (e.g., an output 800) having the data entity and one or more of the plurality of descendant data entities. The generating includes serializing the one or more descendant data entities according to the types of edges defined in the metadata. A particular one of the types of edges may be a recurse edge and thus a target data entity connected to the recurse edge is serialized as a child of a source data entity of the recurse edge. A particular one of the types of edges may be a dead edge and thus a target data entity connected to the dead edge is not serialized. A particular one of the types of edges may be a reference edge and thus a reference to a target date entity connected to the reference edge is included in the output instead of serializing the target data entity and a set of descendant data entities of the target data entity.

A given one of the plurality of descendant data entities may be serialized at most once such that the output includes one instance of the given descendant data entity. The output may include an array of trees in which the data entity and the one or more descendant data entities are stored. A particular one of the types of edges may be an upgrade edge and thus a target data entity connected to the upgrade edge is serialized, in a tree of the array of trees, at a same level or a higher level than a source data entity of the upgrade edge.

Exemplary Computer System

Figure 11:
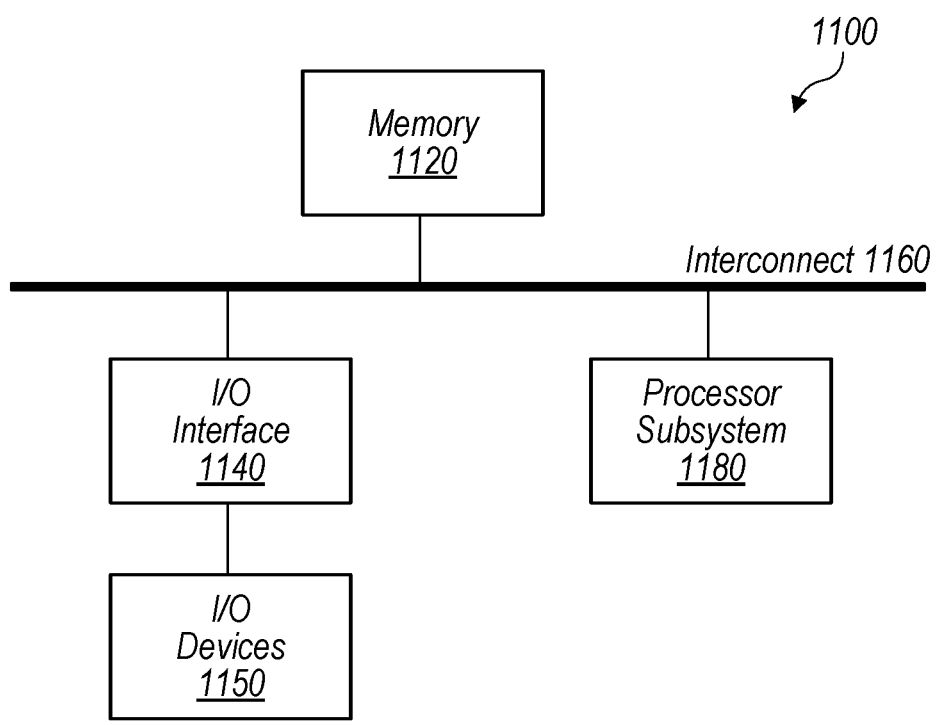
FIG. 11 is a block diagram illustrating elements of a computer system for implementing various systems described in the present disclosure, according to some embodiments.

Turning now to FIG. 11, a block diagram of an exemplary computer system 1100, which may implement system 100, database store 110, database node 140, and/or requestor system 150, is shown. Computer system 1100 includes a processor subsystem 1180 that is coupled to a system memory 1120 and I/O interfaces(s) 1140 via an interconnect 1160 (e.g., a system bus). I/O interface(s) 1140 is coupled to one or more I/O devices 1150. Although a single computer system 1100 is shown in FIG. 11 for convenience, system 1100 may also be implemented as two or more computer systems operating together.

Processor subsystem 1180 may include one or more processors or processing units. In various embodiments of computer system 1100, multiple instances of processor subsystem 1180 may be coupled to interconnect 1160. In various embodiments, processor subsystem 1180 (or each processor unit within 1180) may contain a cache or other form of on-board memory.

System memory 1120 is usable store program instructions executable by processor subsystem 1180 to cause system 1100 perform various operations described herein. System memory 1120 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 1100 is not limited to primary storage such as memory 1120. Rather, computer system 1100 may also include other forms of storage such as cache memory in processor subsystem 1180 and secondary storage on I/O Devices 1150 (e.g., a hard drive, storage array, etc.). In some embodiments, these other forms of storage may also store program instructions executable by processor subsystem 1180. In some embodiments, program instructions that when executed implement creation engine 142, deletion engine 144, and serialization engine 146 may be included/stored within system memory 1120.

I/O interfaces 1140 may be any of various types of interfaces configured to couple to and communicate with other devices, according to various embodiments. In one embodiment, I/O interface 1140 is a bridge chip (e.g., Southbridge) from a front-side to one or more back-side buses. I/O interfaces 1140 may be coupled to one or more I/O devices 1150 via one or more corresponding buses or other interfaces. Examples of I/O devices 1150 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1100 is coupled to a network via a network interface device 1150 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method of serializing triples being accessed from a database, the method comprising:

maintaining, by a computer system, the database that stores data as a plurality of triples, wherein a given one of the plurality of triples includes a first data entity that is connected to a second data entity via an edge, and wherein ones of the plurality of triples are connected to form a plurality of graphs;

storing, by the computer system, metadata that defines types of edges between data entities of the plurality of triples, wherein a given one of the types of edges indicates one of a plurality of different procedures for serializing a target data entity that is connected to the given type of edge;

receiving, by the computer system, a request to access a data entity stored in the database, wherein the data entity is associated with a plurality of descendant data entities connected to the data entity via a set of edges; and generating, by the computer system, an output having the data entity and one or more of the plurality of descendant data entities, wherein the generating includes serializing the one or more descendant data entities based on particular types of the set of edges, wherein the particular types indicate which ones of the plurality of different procedures to implement to serialize the one or more descendent data entities.

2. The method of claim 1, wherein a particular one of the types of edges is a recurse edge, and wherein a target data entity connected to the recurse edge is serialized as a child of a source data entity of the recurse edge.

3. The method of claim 1, wherein a particular one of the types of edges is a dead edge, and wherein a target data entity connected to the dead edge is not serialized.

4. The method of claim 1, wherein a particular one of the types of edges is a reference edge, and wherein a reference to a target data entity connected to the reference edge is included in the output instead of serializing the target data entity and a set of descendant data entities of the target data entity.

5. The method of claim 1, wherein a particular one of the types of edges is an upgrade edge, and wherein a target data entity connected to the upgrade edge is serialized, in a tree of the output, at a same level or a higher level than a source data entity of the upgrade edge.

6. The method of claim 1, wherein a given one of the plurality of descendant data entities is serialized at most once such that the output includes one instance of the given descendant data entity.

7. The method of claim 1, wherein the given triple is associated with a graph identifier that identifies one of the plurality of graphs that includes the given triple.

8. The method of claim 1, wherein at least one of the plurality of descendant data entities is stored within a different graph of the plurality of graphs than the data entity.

9. The method of claim 1, wherein at least one of the plurality of descendant data entities is indirectly connected to the data entity through a triple that does not include the data entity or the at least one descendant data entity.

10. The method of claim 1, wherein the data entity is a root data entity of a graph of the plurality of graphs, and wherein the request is a request to access the graph.

11. A non-transitory computer readable medium having program instructions stored thereon that are executable by a computer system to cause the computer system to perform operations comprising:

maintaining a database that stores data as a plurality of triples, wherein a given one of the plurality of triples includes a first data entity that is connected to a second data entity via an edge, and wherein ones of the plurality of triples are connected to form a plurality of graphs;

storing metadata that defines types of edges between data entities of the plurality of triples, wherein a given one of the types of edges indicates one of a plurality of different procedures for serializing a target data entity that is connected to the given type of edge;

receiving a request to access a data entity stored in the database, wherein the data entity is associated with a plurality of descendant data entities connected to the data entity via a set of edges; and generating an output having the data entity and one or more of the plurality of descendant data entities, wherein the generating includes serializing the one or more descendant data entities based on particular types of the set of edges, wherein the particular types indicate which ones of the plurality of different procedures to implement to serialize the one or more descendent data entities.

12. The non-transitory computer readable medium of claim 11, wherein the output includes an array of trees in which the data entity and the one or more descendant data entities are stored.

13. The non-transitory computer readable medium of claim 12, wherein a particular one of the types of edges is an upgrade edge, and wherein a target data entity connected to the upgrade edge is serialized, in a tree of the array of trees, at a same level or a higher level than a source data entity of the upgrade edge.

14. The non-transitory computer readable medium of claim 12, wherein a particular one of the types of edges is a recurse edge, and wherein a target data entity connected to the recurse edge is serialized, in a tree of the array of trees, as a child of a source data entity of the recurse edge.

15. The non-transitory computer readable medium of claim 11, wherein at least one of the plurality of descendant data entities is associated with a different graph of the plurality of graphs than the data entity.

16. A system, comprising:
at least one processor; and
memory having program instructions stored thereon that are executable by the at least one processor to cause the system to perform operations comprising:
maintaining a database that stores data as a plurality of triples, wherein a given one of the plurality of triples includes a first data entity that is connected to a second data entity via an edge, and wherein ones of the plurality of triples are connected to form a plurality of graphs;

storing metadata that defines types of edges between data entities of the plurality of triples, wherein a given one of the types of edges indicates one of a plurality of different procedures for serializing a target data entity that is connected to the given type of edge;

receiving a request to access a data entity stored in the database, wherein the data entity is associated with a plurality of descendant data entities connected to the data entity via a set of edges; and generating an output having the data entity and one or more of the plurality of descendant data entities, wherein the generating includes serializing the one or more descendant data entities based on particular types of the set of edges, wherein the particular types indicate which ones of the plurality of different procedures to implement to serialize the one or more descendent data entities.

17. The system of claim 16, wherein the operations further comprise:
receiving information that specifies a plurality of data entities;
parsing ones of the plurality of data entities to identify root data entities and descendent data entities that descend from the root data entities; and
for a given one of the root data entities, generating a graph having the given root data entity and descendent data entities of the given root data entity.

18. The system of claim 16, wherein a given one of the one or more descendant data entities is connected to the data entity via at least two different paths, and wherein the given descendant data entity is serialized at most once such that the output includes one instance of the given descendant data entity.

19. The system of claim 16, wherein at least one of the plurality of descendant data entities is stored within a different graph of the plurality of graphs than the data entity.

20. The system of claim 16, wherein at least one of the plurality of descendant data entities and the data entity are part of different ones of the plurality of triples.

* * * * *